United States Patent [19]
Aksyuk et al.

[11] Patent Number: 5,995,688
[45] Date of Patent: Nov. 30, 1999

[54] MICRO-OPTO-ELECTROMECHANICAL DEVICES AND METHOD THEREFOR

[75] Inventors: Vladimir A. Aksyuk, Piscataway; Bradley P. Barber, Basking Ridge; David J. Bishop, Summit; Peter L. Gammel, Millburn; C. Randy Giles, Whippany, all of N.J.

[73] Assignee: Lucent Technologies, Inc., Murray Hill, N.J.

[21] Appl. No.: 09/088,182

[22] Filed: Jun. 1, 1998

[51] Int. Cl.[6] .................................................. G02B 6/12
[52] U.S. Cl. ............................................................ 385/14
[58] Field of Search ....................... 385/10–14; 29/890.1; 216/27, 33, 88, 2; 264/619, 635, 643; 359/630, 196, 631, 712, 839, 880

[56] References Cited

U.S. PATENT DOCUMENTS

| | | | |
|---|---|---|---|
| 4,810,557 | 3/1989 | Blonder | 385/49 |
| 5,559,478 | 9/1996 | Athas et al. | 363/131 |
| 5,665,249 | 9/1997 | Burke et al. | 216/2 |
| 5,683,649 | 11/1997 | Chatterjee et al. | 264/219 |
| 5,903,397 | 5/1999 | Melville et al. | 359/630 |

*Primary Examiner*—Akm E. Ullah

[57] ABSTRACT

A micro-opto-electromechanical systems (MOEMS) device comprises a micro-electromechanical systems (MEMS) device and a silicon optical-bench (SiOB) device or system. The MEMS device interacts with the SiOB mechanically or electromagnetically. In one embodiment, the MEMS device is operable to provide a switching function for the SiOB device. The MEMS device comprises an actuator that is mechanically linked to an optical interruptor that prevents at least a portion of an optical signal incident thereon from propagating therethrough. In an actuated state, the actuator causes the optical interrupter to move into an optical path of an optical signal traveling through an SiOB device. The signal is at least partially reflected or absorbed such that only a portion of the signal propagates beyond the point of contact with the optical interrupter. Since SiOB processing is typically incompatible with MEMS device processing, the MEMS and SiOB devices are formed on separate supports and then attached, such as via flip-chip bonding methods.

13 Claims, 4 Drawing Sheets

MICRO-OPTO-ELECTROMECHANICAL DEVICES AND METHOD THEREFOR

FIELD OF THE INVENTION

The present invention relates generally to integrated-optics systems. More particularly, the present invention relates to improved micro-opto-electromechanical (MOEMS) devices and a method for making same.

BACKGROUND OF THE INVENTION

In hybrid optical systems, individual optical components, typically semiconductor based, are disposed on a single substrate and placed in optical communication with other such components to collectively perform one or more optical functions. Such hybrid systems allow the system designer the flexibility to select optimal materials/technology for each component of the hybrid system.

Hybrid systems often combine III-V semiconductors, desirable as light emitters and active optics (i.e., modulators and detectors), with silicon. In particular, since silicon is readily and precisely micromachinable, it is useful as a support for providing accurate and stable alignment of III-V devices or other components. In addition to its utility as a physical support, silicon provides electronics capabilities, and is useful for forming and/or supporting passive optics (e.g., waveguides, etc.). Used in such a manner, silicon serves as an "optical bench." Optical devices, systems and technology implemented in this manner are conventionally referred to as silicon optical bench (SiOB) devices, etc.

A switching function is often required in SiOB systems. Conventionally, the switching function has been provided using a Mach Zehnder interferometer. The interferometer splits an optical signal into two signals that traverse different optical paths through two waveguide arms. Once separated in that manner, a relative phase shift is, or is not, induced between the two signals. The two signals are then reunited. In the absence of a phase shift, the signals constructively interfere resulting in a maximum output intensity. When an appropriate phase shift (i.e., π) is imparted, destructive interference results, providing a substantial attenuation of the original signal. Thus, an "on-off" function is provided.

Unfortunately, such interferometric switches suffer several drawbacks or limitations, including the polarization dependence of phase modulation, insertion losses, electro-absorption effects and parasitic interference between the two waveguide arms. As such, the art would benefit from a device capable of providing a switching capability to a SiOB device that avoids many of the performance limitations of interferometric switches.

SUMMARY OF THE INVENTION

In one embodiment, a micro-opto-electromechanical systems (MOEMS) device advantageously comprises a micro-electromechanical systems (MEMS) device and an optical bench (OB) device comprising a substrate and at least one optical device. The OB device substrate may be, without limitation, silicon or glass. The MEMS device is operable to provide a switching or other mechanical, electromechanical or electrical function to the OB device. In one embodiment, the MEMS device comprises an actuator that is mechanically linked to an optical interrupter that prevents at least a portion of an optical signal incident thereon from propagating therethrough. The optical interrupter may be, without limitation, a dielectric mirror or an opaque surface. In an actuated state, the MEMS device causes the optical interrupter to move into an optical path of an optical signal traveling through the OB device. The signal is at least partially reflected or absorbed by the optical interrupter. The reflected portion of the signal may be "dumped", directed back to the waveguide that delivered the optical signal, or directed to another waveguide.

Combining a single MEMS device with an OB device to form a MOEMS device as described above is useful. Substantially more utility obtains if thousands or millions of MEMS device can be used in conjunction with an OB device or devices to provide MOEMS devices via a commerically-viable method. Unfortunately, the structure of the present MOEMS device presents difficulties in configuring large numbers of such devices on a chip. In particular, the processing techniques used for fabricating OB device(s) are usually incompatible with MEMS processing such that the MEMS and OB devices cannot be fabricated at the same time on a common substrate or wafer.

In a method in accordance with an illustrative embodiment of the present invention, a first substrate having a plurality of MEMS devices is "flip-chip bonded" to an OB substrate comprising one or more optical devices. In some embodiments, a plurality of bonding sites are formed on each of the substrates. The bonding sites from each chip are brought into contact with one another and bonded using a suitable bonding technique. In some embodiments, the first substrate supporting the MEMS devices is removed after bonding to the OB substrate, leaving the MEMS devices, sans substrate, bonded to the OB substrate.

DETAILED DESCRIPTION

For brevity, the optical bench substrate or device used in conjunction with the present invention is hereinafter referred to as "SiOB" (i.e., silicon optical bench). It should be understood however, that optical benches comprised of glass or other suitable materials may be used in conjunction with the present invention, and that the use herein of the term SiOB is intended to include optical benches comprising such other materials. Moreover, while the terms "MEMS or "MOEMS" generally refers to devices fabricated via surface micromachining techniques, it should be understood that the actuators or other mechanical devices used in conjunction with the present invention can be formed from other technologies, such as, for example, silicon on insulator ("SOI"). Use of the terms "MEMS" or "MOEMS" herein is not intended to include such other fabrication technologies.

Figure 1:
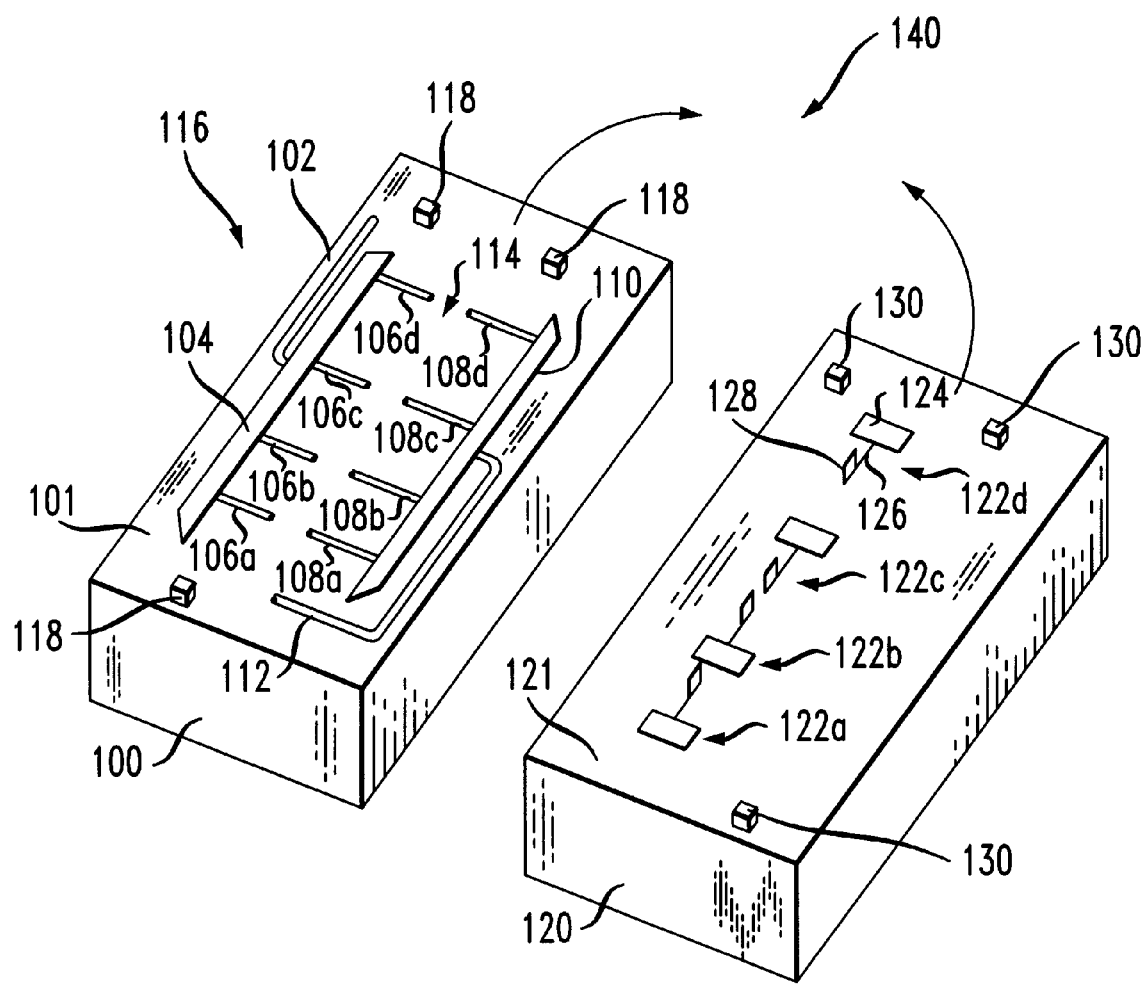
FIG. 1 is a depiction of a OB substrate including an optical system and a MEMS substrate that supports a plurality of MEMS devices. When joined, the substrates and their accompanying devices form a MOEMS device in accordance with an illustrative embodiment of the present invention.

FIG. 1 depicts a SiOB substrate 100 including SiOB device or optical system 116 and a second substrate 120 that supports a plurality of MEMS devices 122a–122d. MOEMS device 140 results when SiOB substrate 100 and second substrate 120 are joined such that substrate surface 101 of SiOB substrate 100 is disposed in spaced and opposed relation to substrate surface 121 of second substrate 120.

In one embodiment, substrates 100 and 120 are joined by: (1) aligning bonding sites 118 on substrate surface 101 with bonding sites 130 on substrate surface 121; (2) bringing bonding sites 118 into contact with bonding sites 130; and (3) bonding the respective sites using a suitable bonding method, such as thermocompression bonding or solder reflow, known in the art. Further description of the bonding sites and illustrative implementations thereof are provided later in this specification.

Illustrative SiOB device 116 depicted in FIG. 1 includes input waveguide 102, demultiplexer 104, component waveguides 106a–106d and 108a–108d, multiplexer 110 and output waveguide 112. Each component waveguide 106a–d is separated from each corresponding component waveguide 108a–d via gap or notch 114. It should be understood that such optical elements were selected for the purposes of illustration and are not intended to limit the present invention. A wide variety of optical (SiOB) devices having countless structural variations may be used in conjunction with MEMS devices according to the present teachings to form MOEMS devices.

Each illustrative MEMS device 122a–122d comprises actuator 124, optical interruptor 128 and linkage 126. Linkage 126 mechanically connects optical interrupter 128 with actuator 124. Light incident on optical interrupter 128 is substantially prevented from passing therethrough. More particularly, depending upon application specifics, the optical signal is substantially absorbed or reflected. In some embodiments in which it is desirable to absorb the optical signal, the optical interrupter 128 is an optical modulator. In some embodiments in which it is acceptable to reflect the optical signal, the optical interrupter 128 is a dielectric mirror or other light-impenetrable surface.

Actuator 124 is operable to impart an "out-of-plane" motion to linkage 126 and, hence, to optical interrupter 128. When the first and second substrates are joined as described, optical interrupter 128 of each MEMS device 122a–122d is aligned with gap 114 between respective component waveguides 106a–d and 108a–d. The out-of-plane motion imparted by actuators 124 to each optical interrupter 128 causes the interrupters to move towards (away from) the substrate surface 101 and into (out of) the path of an optical signal travelling from component waveguides 106a–d to component waveguides 108a–d. When optical interruptor 128 is in the optical path, the optical signal is at least partially blocked from proceeding to component waveguides 108a–d.

Further detail concerning the implementation of MEMS device 122 and the manner in which it operates in conjunction with an optical system on a SiOB substrate is provided below in conjunction with FIGS. 2–7.

Figure 2:
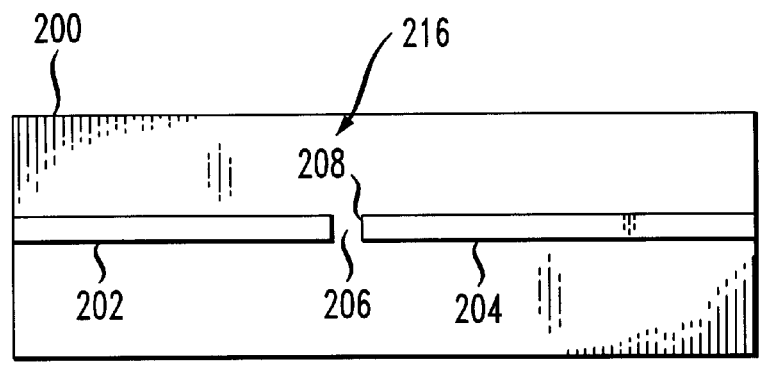
FIG. 2 depicts a portion of an optical system on an OB substrate.

FIG. 2 shows a portion 216 of an optical device on a substrate 200. Waveguides 202 and 204 are disposed on substrate 200. Such waveguides can be formed from silicon, silica or other material, in well-known fashion. In the present embodiment, waveguide 202 is assumed to deliver an optical signal to waveguide 204. Gap 206 between waveguides 202 and 204 receives an optical interrupter (not shown).

Gap 206 must be very narrow to ensure that substantially all of the optical signal traveling through waveguide 202 is launched into waveguide 204. The size of gap 206 is a function of the mode shape of the optical signal. As is well known, the mode shape is dependent on waveguide size and the refractive index(ices) of the material(s) that form waveguides 202 and 206. In one embodiment, wherein waveguides on a SiOB substrate have a width (they are rectangular, not circular like fibers) of about 10 microns, a gap 206 having a size of about 10 microns or less has been found to be acceptable. An antireflection coating is advantageously disposed at end 208 of waveguide 206 to minimize back-reflection of the optical signal. Additionally, end 208 of waveguide 206 may be "angled," in well-known fashion, to prevent such back-reflections.

Figure 3:
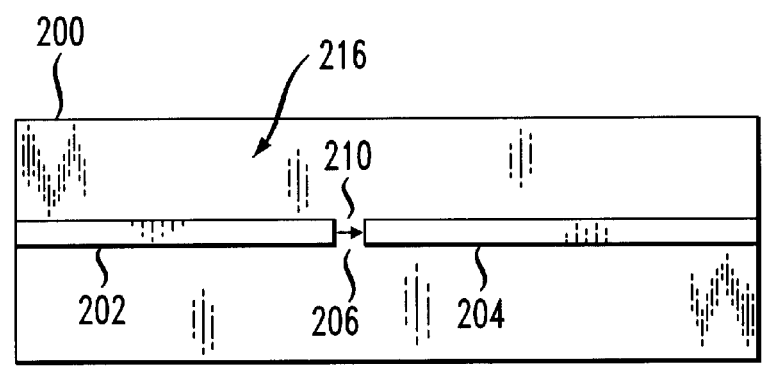
FIG. 3 depicts a ray tracing of an optical signal passing through the portion of the optical system depicted in FIG. 2.
Figure 4:
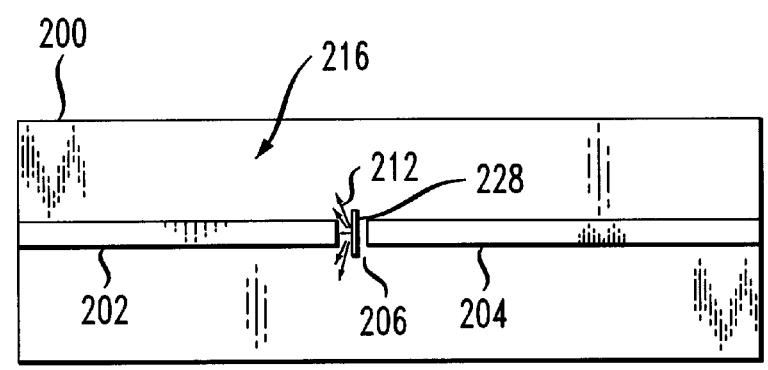
FIG. 4 depicts a ray tracing of an optical signal passing through the portion of the optical system depicted in FIG. 2 when an optical interrupter is present in the signal path.

FIG. 3 depicts an unimpeded path 210 of an optical signal across gap 206 of the optical device shown in FIG. 2. FIG. 4 depicts a path 212 of the optical signal when an optical interrupter 228 is present within gap 206. In the embodiment depicted in FIG. 4, optical interrupter 228 is assumed to be a reflective, rather than an absorptive device. As depicted in FIG. 4, the optical signal passes from waveguide 202 to optical interrupter 228. The optical signal is reflected from optical interrupter 228 to one of a variety of destinations. For example, in one embodiment, the optical signal is reflected into waveguide 202. In another embodiment, the optical signal is reflected into another waveguide (not shown). In yet another embodiment, the optical signal is scattered on reflection from optical interrupter 228.

Figure 5A:
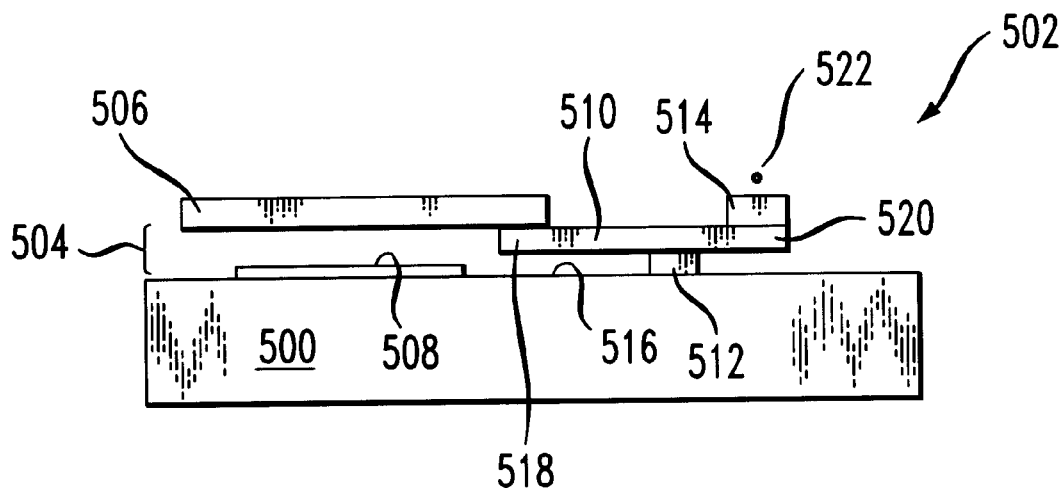
FIG. 5a depicts a MEMS device, in an unactuated state, that is suitable for providing switching action to an optical device located on an OB substrate.

A wide variety of MEMS structures can suitably be used for imparting the requisite movement to an optical interrupter to provide the desired switching action described above. A simplified schematic of a MEMS device 502 for providing such actuation is depicted disposed on support 501 in FIGS. 5a and 5b. FIG. 5a depicts MEMS device 502 in an "unactuated" state, wherein the optical interruptor is out of the path of optical signal 522 traveling "out-of-the-page." FIG. 5b depicts the device in an "actuated" state, wherein the optical interrupter engages optical signal 522.

MEMS device 502 includes plate actuator 504, optical interruptor 514, and linkage 510. Plate actuator 504 includes two conductive surfaces or electrodes: movable plate electrode 506 and fixed electrode 508. Plate electrode 506 is suspended by a flexible support (not shown) over fixed electrode 508 that is disposed on surface 516 of substrate 500. Movable plate electrode 506 may be fabricated from polysilicon or other conductive materials. Fixed electrode 508 may be fabricated from polysilicon or other conductive materials, or alternatively, substrate 500 may be suitably doped to render a region of thereof conductive to function as fixed electrode 508.

In some embodiments, optical interruptor 514 is a fixed-reflectivity device, such as a dielectric mirror, a metallized surface or the like. In other embodiments, optical interrupter 514 is a variable-reflectivity device, such as an optical modulator.

Figure 5B:
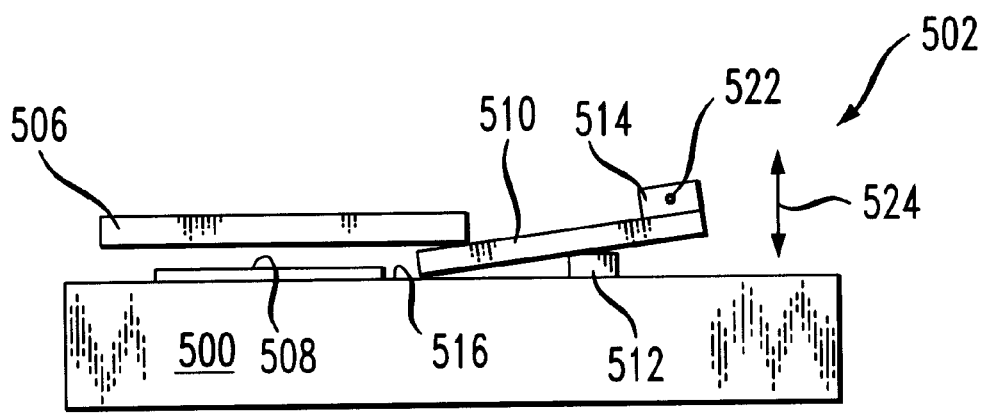
FIG. 5b depicts the MEMS device of FIG. 5a in an actuated state.

Linkage 510, implemented as a simple beam in the embodiment shown in FIGS. 5a and 5b, mechanically links or interconnects plate actuator 504 to optical interrupter 514. More particularly, in the embodiment depicted in FIGS. 5a and 5b, a first end 518 of linkage 510 underlies and abuts a portion of movable plate electrode 506, and a second end 520 of linkage 510 supports optical interruptor 514. Linkage 510 rests on fulcrum 512 forming a lever mechanism.

Electrodes 506 and 508 of plate actuator 504 are in electrical contact with a voltage source (not shown). When a voltage is applied across plate actuator 504, an electrostatic attraction is developed between movable plate electrode 506 and fixed electrode 508. Such attraction causes movable electrode 506 to move downwardly towards fixed electrode 508. As movable electrode 506 moves downwardly, first end 518 of linkage 510 is forced downwardly towards substrate surface 516, causing second end 520 of linkage 510 and depending optical interruptor 514 to rise. In the aforedescribed manner, plate actuator 504 imparts a vertical or out-of-plane motion to linkage 510 such that optical interruptor 514 moves in a substantially "up-and-down" or vertically reciprocating motion indicated by direction vector 524.

To prevent movable plate electrode 506 from contacting fixed electrode 508, small posts (not shown) advantageously protrude from the "bottom" surface of movable plate electrode 506. As it is advantageous (if not necessary depending upon the fabrication process) to pattern such posts from the material that forms the plate electrode, such posts will be conductive. Thus, such posts must not contact the fixed electrode. In one embodiment, holes (not shown) are formed in the fixed electrode and aligned to receive such posts, so that rather than touching down on the fixed electrode, the posts touch down on an insulating layer disposed therebeneath.

Technology for fabricating MEMS devices is available from many sources, such as, for example, the MEMS Technology Application Center at North Carolina (MCNC). MCNC MEMS technology is a three-polysilicon-layer surface-micromachining process. The lowest polysilicon layer, POLY0, is non-releasable and is used to patterning address electrodes and local wiring on a substrate, such as a silicon wafer or chip. The upper two polysilicon layers, POLY1 and POLY2 are releasable to form mechanical structures. Such release is achieved by etching away sacrificial oxide layers deposited between the polysilicon layers during fabrication. The polysilicon and oxide layers are individually patterned, and unwanted material from each layer is removed by reactive ion etching before the next layer is added.

When fabricating a micron-sized mechanical structure, a variety of hinged-plates of differing size and shape, and disposed in specific locations on a substrate, are often formed. Forming such hinged plates is known in the art. See, Pister et al., "Microfabricated Hinges," vol. 33, Sensors and Actuators A, pp. 249–56, 1992. See also assignee's co-pending patent applications MICRO MACHINED OPTICAL SWITCH, filed May 15, 1997 as Ser. No. 08/856569; and METHODS AND APPARATUS FOR MAKING A MICRODEVICE, filed May 15, 1997 as Ser. No. 08/856565, both of which applications are incorporated by reference herein.

As formed, the hinged plates lie flat on the surface of the substrate. Thus, assembling a structure from such plates requires rotating them, about their hinges, out of the plane of the substrate. Typically, some of the hinged plates will be rotated by ninety degrees, and others by a lesser amount. See assignee's co-pending patent application SELF-ASSEMBLING MICRO-MECHANICAL DEVICE, filed Dec. 22, 1997 as Ser. No. 08/997175, incorporated by reference herein.

MEMS devices configured as depicted in FIGS. 5a and 5b have been built. The sample devices included movable plate electrodes ranging in size from about 220×170 to 300×350 square microns and having a gap between the movable and fixed electrodes of 2.75 microns in the unactuated state. The movable plate electrodes included posts to preventing shorting. Such posts protruded about 0.75 micron from the movable electrode. The linkage was implemented as a polysilicon beam, which ranged in length in the various devices from about 500 to 575 microns. Vertical displacements of the linkage as high as 15 to 20 microns were obtained from voltages in the range of 20 to 40 volts. Such a displacement should be sufficient to provide a low insertion loss, high contrast ratio switch.

As previously noted, a wide variety of configurations of MEMS actuators known in the art may suitably be used to provide the requisite actuation to an optical interrupter. See, for example, Hashimoto et al., "Micro-Optical Gate for Fiber Optic Communication," Transducers '97, 1997 Int'l. Conf. Solid-State Sensors and Actuators, Chicago, Jun. 16–19, 1997, pp. 331–334, incorporated by reference herein; and assignee's aforereferenced patent application Ser. No. 08/856569. In addition to actuators that provide "out-of-plane" motion, such as described above, actuators configured to provide "in-plane" plane actuation, examples of which are described in the present assignee's previously referenced U.S. patent application Ser. No. 08/856569, may suitably be used.

In the embodiments described herein, the optical interruptor moves into the path of an optical signal traveling through the SiOB device upon actuation. In other embodiments, MEMS device 502 is configured so that the optical interruptor moves out of the optical path of the SiOB device when actuated.

Figure 6:
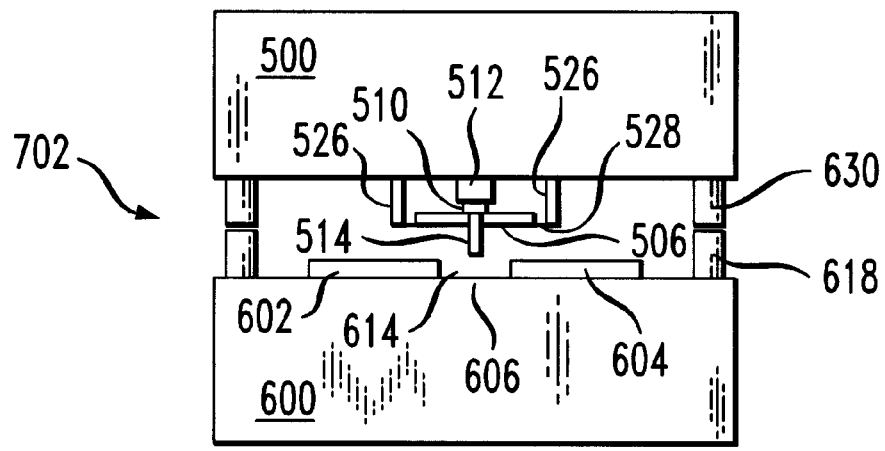
FIG. 6 depicts a MOEMS device comprising a MEMS device and an optical device on an OB substrate, wherein the MEMS device is in a non-actuated state.
Figure 7:
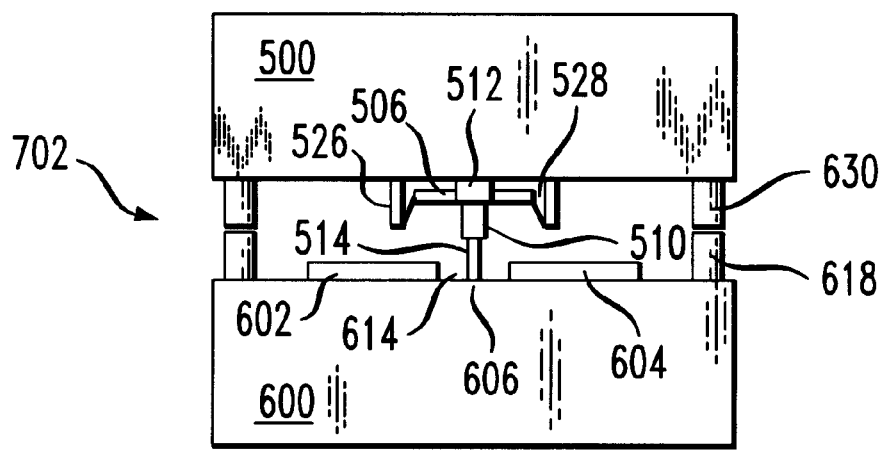
FIG. 7 depicts the MOEMS device of FIG. 6, wherein the MEMS device is in an actuated state.

FIGS. 6 and 7 depict MOEMS device 702 comprising MEMS device 502 of FIG. 5 and an SiOB device comprising waveguides 602 and 606. MOEMS device 702 is formed by joining substrate 500 to SiOB substrate 600 at bonding sites 630 and 618. MEMS device 502 is aligned with gap 606 between waveguides 602 and 604. Plate supports 526 support movable plate electrode 506 "above" fixed electrode 508 (not shown) on support 500. A flexible member 528 connects plate electrode 508 to plate support 526.

FIG. 6 depicts MEMS device 502 in an "unactuated" state. For the embodiment depicted in FIG. 6, optical interrupter 514 remains out of an optical path of an optical signal traveling between waveguides 602 and 606 when MEMS device 502 is in the unactuated state.

FIG. 7 depicts MEMS device 502 in an "actuated" state. When so actuated (i.e., voltage is applied across movable plate electrode 506 and fixed electrode 508), plate electrode 506 move towards fixed electrode 508 (not shown in FIG. 7). Flexible member 528 depending from each plate support 526 allows for such movement. As previously described, movement of plate electrode 506 towards fixed electrode 508 moves linkage 510 and optical interruptor 514. Thus, optical interruptor 514 is moved into the optical path of the signal traveling between waveguides 602 and 606.

It is within the capabilities of those skilled in the art to suitably configure two substrates and a MEMS device such that the optical interruptor moves into and out of the optical path of an optical signal travelling through an optical device on a SiOB substrate due to actuator movement.

In the illustrated embodiments, the MEMS device provides a switching function. It should be appreciated that in other embodiments, MEMS devices configured as actuators provide functions other than switching. Moreover, MEMS devices can be configured to provide functionalities other than actuation or switching. For example, MEMS devices can be configured to provide the functionality of sensors and electronic components, to name just a few. The nature of the interaction or communication between the MEMS device and the optical system on the SiOB substrate will vary depending upon the specific application. For example, in some embodiments, the interaction is mechanical, such as when a MEMS actuator moves a SiOB device. In other embodiments, the interaction is electromagnetic, including optical, electrical and magnetic interactions. An optical interaction is depicted in the illustrated embodiment wherein a MEMS device interrupts an optical signal. As to electrical and magnetic interactions, electrical or magnetic fields generated by MEMS devices can interact with SiOB devices to cause changes in SiOB device operation. Integrating any of a variety of MEMS devices with optical (or other devices) on a SiOB substrate or chip to interact or commmunicate in a variety of ways are within the contemplated scope of the present invention.

As previously described, bonding sites are provided on the "MEMS" substrate and the "SiOB" substrate such that they can be joined to form a MOEMS device in accordance with the present teachings. Suitable alignment and bonding techniques are described only briefly below as such techniques are well-known in the art.

Physical alignment of the MEMS substrate to the SiOB substrate is facilitated by grooves, pedestals, stops and the like that are readily fabricated (e.g., etching, photolithographically defining features, etc.), on one or both of the substrates. Once the two substrates are aligned, they are bonded at bonding sites. Bonding techniques such as thermocompression bonding, laser spot welding, soldering and gluing with UV-curable epoxies can be used. Advantageously, the substrates are "flip-chip" bonded, according to well-known methods, described briefly below.

In flip-chip bonding, bonding sites, embodied for example as contact pads, are formed on both substrates. Solder "bumps," typically formed from lead/tin solder, are deposited on the contact pads on one of the substrates. The substrates are pressed together sandwiching the solder bumps between the contact pads of the two substrates. The solder is heated until it "reflows." The surface tension between the solder and the contact pads tends to align the contact pads. In some embodiments, the substrate of the MEMS chip is advantageously removed via an etchant, leaving the MEMS structures, sans substrate, attached to the SiOB chip. In such embodiments, MEMS structures may receive drive voltage or current, as required, from wire traces on the SiOB chip. As such, the contact pads and solder by which the MEMS structures are attached to the SiOB substrate must be conductive.

It is to be understood that the embodiments described herein are merely illustrative of the many possible specific arrangements that can be devised in application of the principles of the invention. Other arrangements can be devised in accordance with these principles by those of ordinary skill in the art without departing from the scope and spirit of the invention. It is therefore intended that such other arrangements be included within the scope of the following claims and their equivalents.

We claim:

1. An article comprising:
   a micro-electromechanical systems chip comprising a first substrate having a micro-electromechanical device and a first plurality of bonding sites disposed on a first surface thereof; and
   an optical bench chip comprising a second substrate having an optical device and a second plurality of bonding sites disposed on a first surface thereof; wherein,
   the first and second substrates are attached at the respective first and second pluralities of bonding sites such that the first surfaces of each substrate are in opposed and spaced relation to one another, and further wherein the micro-electromechanical device and the optical device communicate with one another either mechanically or electromagnetically.

2. The article of claim 1, wherein the micro-electromechanical device is operable to move with applied electrical energy.

3. The article of claim 2, wherein the micro-electromechanical device comprises an actuator.

4. The article of claim 3, wherein the micro-electromechanical device further comprises an optical interruptor and a linkage, wherein the linkage mechanically connects the optical interruptor to the actuator, and the actuator is operable to move the optical interrupter between a first position and a second position.

5. The article of claim 4, wherein the optical device comprises first and second optically communicating and spaced waveguides.

6. The article of claim 5, wherein in the first position, the optical interrupter is not within the space between the waveguides, and, in the second position, the optical interruptor is within the space between the waveguides such that the optical interrupter is operative to block a least a portion of an optical signal traveling between the first and second waveguides.

7. The article of claim 3, wherein the actuator comprises:
   a nonmoving conductive surface; and
   a movable conductive plate supported over the nonmoving surface by a plate support having a flexible member that allows the movable plate to move in an out-of-plane direction relative to the nonmoving surface; wherein,
   the nonmoving surface and movable plate are suitably spaced to support an electrostatic charge therebetween operable to cause the movable plate to move towards the nonmoving plate upon application of a voltage.

8. The article of claim 4, wherein the actuator comprises:
   a nonmoving conductive surface; and
   a movable conductive plate supported over the nonmoving surface by a plate support having a flexible member that allows the movable plate to move in an out-of-plane direction relative to the nonmoving surface; wherein,
   the nonmoving surface and movable plate are suitably spaced to support an electrostatic charge therebetween operable to cause the movable plate to move towards the nonmoving plate upon application of a voltage, which movement causes the linkage to move and, in turn, moves the optical interrupter between the first and second positions.

9. The article of claim 1, wherein the second substrate comprises silicon.

10. A method for making a micro-optical electromechanical device, comprising the steps of:
    forming a micro-electromechanical device and first plurality of bonding sites on a first support;
    forming an optical device and second plurality of bonding sites on a second support;

aligning the first plurality of bonding sites with the second plurality of bonding sites; and bonding the first plurality of bonding sites to the second plurality of bonding sites.

11. The method of claim 10, wherein forming the first and second plurality of bonding sites further comprises forming conductive contacts.

12. The method of claim 10, wherein the step of bonding further comprises flip-chip bonding.

13. The method of claim 12, further comprising the step of removing the first support.

* * * * *